United States Patent
Itou

(10) Patent No.: US 9,436,242 B2
(45) Date of Patent: Sep. 6, 2016

(54) RESET SIGNAL CONTROL APPARATUS FOR PROTECTING A MICROCOMPUTER

(71) Applicant: DENSO CORPORATION, Kariya, Aichi-pref. (JP)

(72) Inventor: Akito Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 14/320,912

(22) Filed: Jul. 1, 2014

(65) Prior Publication Data

US 2015/0026502 A1    Jan. 22, 2015

(30) Foreign Application Priority Data

Jul. 17, 2013    (JP) .................................. 2013-148783

(51) Int. Cl.
  *G06F 11/00* (2006.01)
  *G06F 1/24* (2006.01)
  *G06F 11/30* (2006.01)

(52) U.S. Cl.
  CPC .............. *G06F 1/24* (2013.01); *G06F 11/3062* (2013.01); *G06F 2201/81* (2013.01)

(58) Field of Classification Search
  CPC ......... G06F 1/24; G06F 1/26; G06F 11/3062
  USPC ..................... 714/23, 24; 713/340
  See application file for complete search history.

(56) References Cited

U.S. PATENT DOCUMENTS

| | | | |
|---|---|---|---|
| 7,181,340 B2 * | 2/2007 | Endo ..................... | F02D 41/26 701/114 |
| 2006/0197603 A1 | 9/2006 | Miho | |
| 2007/0247765 A1 * | 10/2007 | Takahashi .......... | H03K 17/0822 361/18 |
| 2008/0034242 A1 | 2/2008 | Ishikura et al. | |
| 2010/0275048 A1 | 10/2010 | Ishikura et al. | |
| 2011/0267115 A1 | 11/2011 | Yamamoto et al. | |
| 2013/0332085 A1 * | 12/2013 | Yang .................... | G01N 27/026 702/22 |

FOREIGN PATENT DOCUMENTS

| | | |
|---|---|---|
| JP | 59-226918 A | 12/1984 |
| JP | 2002-124874 A | 4/2002 |

(Continued)

OTHER PUBLICATIONS

Office Action mailed Aug. 4, 2015 issued in corresponding JP patent application No. 2013-148783 (and English translation).

*Primary Examiner* — Elmira Mehrmanesh
(74) *Attorney, Agent, or Firm* — Posz Law Group, PLC

(57) ABSTRACT

A reset signal control apparatus outputs a reset signal to a microcomputer to restrict a malfunction of the microcomputer when the microcomputer is started. The reset signal control apparatus outputs the reset signal to the microcomputer at least until a clock signal provided by an oscillation circuit and based on which the microcomputer operates is stabilized. The reset signal control apparatus includes a power supply section, a measuring section, and an output ending section. The power supply section supplies a power to the oscillation circuit and the microcomputer. The measuring section measures a consumption current of the oscillation circuit and the microcomputer. The output ending section determines that the clock signal provided by the oscillation circuit is stabilized and ends an output of the reset signal to the microcomputer when the consumption current becomes equal to or higher than a predetermined threshold value.

8 Claims, 3 Drawing Sheets

(56) References Cited

FOREIGN PATENT DOCUMENTS

| JP | 2004-304334 A | 10/2004 |
| JP | 2005-278070 A | 10/2005 |
| JP | 2007-336037 A | 12/2007 |
| JP | 2009-044434 A | 2/2009 |

* cited by examiner ial Application
RESET SIGNAL CONTROL APPARATUS FOR PROTECTING A MICROCOMPUTER

CROSS REFERENCE TO RELATED APPLICATION

This application is based on Japanese Patent Application No. 2013-148783 filed on Jul. 17, 2013, the disclosure of which is incorporated herein by reference.

TECHNICAL FIELD

The present disclosure relates to a reset signal control apparatus that outputs a reset signal to a microcomputer in order to restrict a malfunction of the microcomputer when the microcomputer is started.

BACKGROUND

JP 2007-336037 A discloses a reset signal control apparatus that is able to reduce an output period of a reset signal when a microprocessor is started. The reset signal control apparatus receives, from the microcomputer, a clock signal based on which the microprocessor operates, and inputs the received clock signal to a reset control circuit as a feedback signal. The reset control circuit outputs a reset signal to the microcomputer with monitoring the clock signal. When the reset control circuit determines that the clock signal becomes stable, the reset control circuit stops an output of the reset signal after a stabilization period of the microprocessor has elapsed.

However, in the above-described reset signal control apparatus, the microprocessor needs a terminal for outputting the clock signal to the reset signal control apparatus, and the reset signal control apparatus needs a terminal for receiving the clock signal from the microcomputer. Thus, both a quantity of the terminals in the microprocessor and a quantity of the terminals in the reset control circuit increase, and accordingly, a cost and a size of the reset signal control apparatus is increased.

SUMMARY

In view of the foregoing difficulties, it is an object of the present disclosure to provide a reset signal control apparatus that is able to determine whether a clock signal of a microcomputer becomes stable and is able to stop an output of a reset signal to the microcomputer without a delay even when the clock signal of the microcomputer is not input to the reset signal control apparatus.

According to an aspect of the present disclosure, a reset signal control apparatus outputs a reset signal to a microcomputer in order to restrict a malfunction of the microcomputer when the microcomputer is started. The microcomputer is connected with an oscillation circuit that provides a clock signal to the microcomputer, and the reset signal control apparatus outputs the reset signal to the microcomputer at least until the clock signal based on which the microcomputer operates is stabilized. The reset signal control apparatus includes a power supply section, a measuring section, and an output ending section. The power supply section supplies a power to the oscillation circuit and the microcomputer. The measuring section measures a consumption current of the oscillation circuit and the microcomputer when the power supply section supplies the power to the oscillation circuit and the microcomputer. The output ending section, when the measuring section determines that the consumption current becomes equal to or higher than a predetermined threshold value, determines that the clock signal provided by the oscillation circuit is stabilized and ends an output of the reset signal to the microcomputer.

With the above apparatus, the output of the reset signal to the microcomputer can be ended promptly without a delay even when the clock signal of the microcomputer is not input to the reset signal control apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

The following will describe a reset signal control apparatus according to a first embodiment of the present disclosure with reference to accompanying drawings. The reset signal control apparatus according to the present disclosure outputs a reset signal to a microcomputer in order to restrict a malfunction of the microcomputer when the microcomputer is started. The microcomputer is connected with an oscillation circuit that provides a clock signal to the microcomputer so that the microcomputer operates based on the clock signal. The reset signal control apparatus according to the present disclosure outputs the reset signal to the microcomputer at least until the clock signal based on which the microcomputer operates is stabilized.

Figure 1:
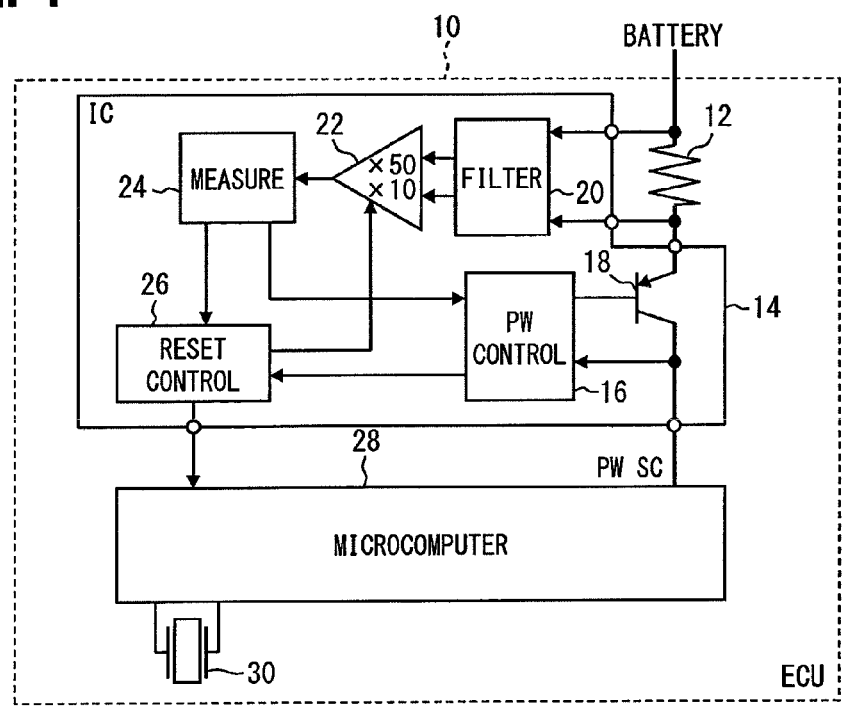
FIG. 1 is a diagram showing a configuration of an electronic control apparatus including a reset signal control apparatus according to a first embodiment of the present disclosure.

FIG. 1 shows a configuration of an electronic control apparatus, which includes a reset signal control apparatus according to the present embodiment of the present disclosure. Hereinafter, the electronic control apparatus is referred to as ECU. As shown in FIG. 1, the ECU 10 includes the reset signal control apparatus and a microcomputer 28.

As well known, the microcomputer 28 includes a central processing unit (CPU), a read only memory (ROM), a random access memory (RAM), an input/output (I/O), an analog digital converter (A/D) and the like. For example, the microcomputer 28, based on various detection signals, performs a predetermined arithmetic processing, and outputs a control signal to a control target (not shown) in order to control an operation of the control target.

As shown in FIG. 1, the microcomputer 28 is connected with an external oscillation circuit 30 that includes a crystal oscillation element. The microcomputer 28 includes, for example, two clock oscillators (not shown) provided by well-known phase-locked loop (PLL) circuits at the inside. In order to differentiate the clock oscillator included at the inside of the microcomputer 28 from the external oscillation circuit 30, the clock oscillator included in the microcomputer 28 is also referred to as an internal clock oscillator. In the microcomputer 28, one of the clock oscillators generates, based on the clock signal generated and provided by the external oscillation circuit 30, a main clock signal based on which the CPU mainly operates. The other one of the clock oscillators generates, based on the clock signal generated and provided by the external oscillation circuit 30, a sub clock signal based on which the I/O, the A/D, and periphery circuits operate.

The reset signal control apparatus includes an integrated circuit (IC) 14 and a resistor 12 that is connected with the IC 14 at an external side of the IC 14. The resistor 12 is also referred to as external resistor. When the microcomputer 28 is powered on from a power-off state in which power supply is interrupted and operation is stopped, the reset signal control apparatus outputs a reset signal to the microcomputer 28 in order to restrict a malfunction of the microcomputer 28. The reset signal control apparatus outputs the reset signal to the microcomputer 28 at least until the clock signal generated by the oscillation circuit 30 is stabilized. As shown in FIG. 1, the microcomputer 28 and the oscillation circuit 30 have a common power supply line. The microcomputer 28 and the oscillation circuit 30 are configured to start operation when an operation voltage (for example, 5V) is applied to the microcomputer 28 and the oscillation circuit 30 via the power supply line. Specifically, when the power is supplied to the microcomputer 28, that is, during a startup period of the microcomputer 28, the internal clock oscillators of the microcomputer 28 and the oscillation circuit 30 start operations corresponding to the power supply, while the CPU of the microcomputer 28 maintains an off state corresponding to a reset signal. Herein, the reset signal based on which the CPU of the microcomputer 28 maintains the off state is output from the reset signal control apparatus and is input to the CPU of the microcomputer 28.

As shown in FIG. 1, the resistor 12 is included in the power supply line of the microcomputer 28 and the oscillation circuit 30, and is connected to a power source (PW SC), such as a battery. As described above, the resistor 12 is connected with the IC 14 at the external side of the IC 14. Thus, the resistor 12 can be easily changed to a different appropriate resistor having a proper resistance value corresponding to a type of the microcomputer 28 and other loads. When the operation voltage is applied to the microcomputer 28 and the oscillation circuit 30 via the power supply line, a value of a current that flows through the power supply line is converted to a voltage signal via the resistor 12. Herein, the current flowing through the power supply line is a consumption current consumed in the microcomputer 28 and the oscillation circuit 30.

The IC 14 includes a power control section (PW CONTROL) 16, a transistor 18, a low pass filter (FILTER) 20, an amplifying circuit 22, a current measuring section (MEASURE) 24, and a reset control section (RESET CONTROL) 26.

The transistor 18 is included in the power supply line, and is connected with the resistor 12 in series at an internal side of the IC 14. The transistor 18 is controlled by the power control section 16, and generates the operation voltage for the microcomputer 28 and the oscillation circuit 30. Specifically, the power control section 16 detects an emitter voltage of the transistor 18, and controls an on-off state of the transistor 18 so that the emitter voltage is equal to the operation voltage. For example, when the power control section 16 detects an overcurrent in the power supply line caused by a short circuit, the power control section 16 stops the power supply to the microcomputer 28 by turning off the transistor 18 in order to protect the microcomputer 28. When (i) the operation voltage of the microcomputer 28 and the oscillation circuit 30, that is, the emitter voltage of the transistor 18 is equal to or lower than a lower limit of an allowable voltage range, or (ii) a change amount of the operation voltage of the microcomputer 28 and the oscillation circuit 30 is greater than a predetermined allowable change amount, the microcomputer 28 may fail to operate properly. Thus, in any one of these two cases (i) and (ii), the power control section 16 outputs a forbiddance signal to the reset control section 26 in order to instruct the reset control section 26 to not end an output of the reset signal to the microcomputer 28. That is, the power control section 16 outputs the forbiddance signal to the reset control section 26 in order to instruct the reset control section 26 to continue the output of the reset signal.

The IC 14 includes the low pass filter 20 that is disposed at the internal side of the IC 14. The voltage signal converted by the resistor 12 is input to the low pass filter 20. When the current flowing through the power supply line fluctuates caused by an external noise or an inrush current to an internal or external capacitor, the low pass filter 20 restricts adverse effect of the external noise or the inrush current so that a measuring accuracy of the consumption current of the microcomputer 28 and the oscillation circuit 30 is increased. The low pass filter 20 attenuates or removes, from the voltage signal, unwanted signal components whose frequencies are equal to or higher than a predetermined frequency, and inputs the filtered voltage signal to the amplifying circuit 22.

In the present embodiment, an amplifier is provided as an example of the amplifying circuit 22. The amplifier 22 amplifies inputted voltage signal, and outputs the amplified voltage signal to the current measuring section 24. The amplifier 22 in the present embodiment is able to switch an amplifying degree (amplifying gain) between a high level (first level) and a low level (second level). As an example, the high level may be set to an amplifying gain of 50 times "×50", and the low level may be set to an amplifying gain of 10 times "×10" as shown in FIG. 1. The amplifying degree of the amplifier 22 is switched by the reset control section 26. Specifically, when the reset control section 26 outputs the reset signal to the microcomputer 28 during the startup period of the microcomputer 28, the amplifying degree of the amplifier 22 is set to the high level. During an initial period of the power supply to the microcomputer 28 and the oscillation circuit 30, the consumption current of the microcomputer 28 and the oscillation circuit 30 is relatively low. Thus, the amplifying degree of the amplifier 22 is set to the high level. When the reset control section 26 ends the output of the reset signal to the microcomputer 28, the amplifying degree of the amplifier 22 is switched from the high level to the low level. After the output of the reset signal is ended, the microcomputer 28 and the oscillation circuit 30 operate properly in a normal state, and the consumption current increases corresponding to the proper operation of the microcomputer 28 and the oscillation circuit 30. Thus, the amplifying degree of the amplifier 22 is set to the low level. Thus, regardless of the value of the consumption current, the consumption current can be measured at high accuracy by switching the amplifying degree of the amplifier 22 corresponding to the value of the consumption current.

The current measuring section 24 receives the voltage signal that is amplified by the amplifier 22, and measures a magnitude of the consumption current consumed in the microcomputer 28 and the oscillation circuit 30.

Specifically, during the startup period of the microcomputer 28, the current measuring section 24 measures the consumption current by comparing the voltage signal input to the current measuring section 24 with a consumption current threshold value of the oscillation circuit 30. Herein, the consumption current threshold value of the oscillation circuit 30 is set corresponding to a consumption current of the oscillation circuit 30, which is measured under a condition that the clock signal generated by the oscillation circuit 30 becomes stable. When the voltage signal is equal to or higher than the consumption current threshold value, the current measuring section 24 determines that the voltage signal is equal to or higher than the consumption current that is necessary for stabilizing the clock signal. Thus, the current measuring section 24 outputs an ending instruction signal in order to instruct the reset control section 26 to end the output of the reset signal. During a normal operation period of the microcomputer 28, the current measuring section 24 measures the consumption current by comparing the voltage signal input to the current measuring section 24 with an overcurrent threshold value. Herein, the overcurrent threshold value is a value to determine an overcurrent. When the voltage signal is equal to or higher than the overcurrent threshold value, the current measuring section 24 determines an occurrence of the overcurrent. Thus, the current measuring section 24 outputs a power supply instruction signal in order to instruct the power control section 16 to stop the power supply to the microcomputer 28 and the oscillation circuit 30.

Figure 2:
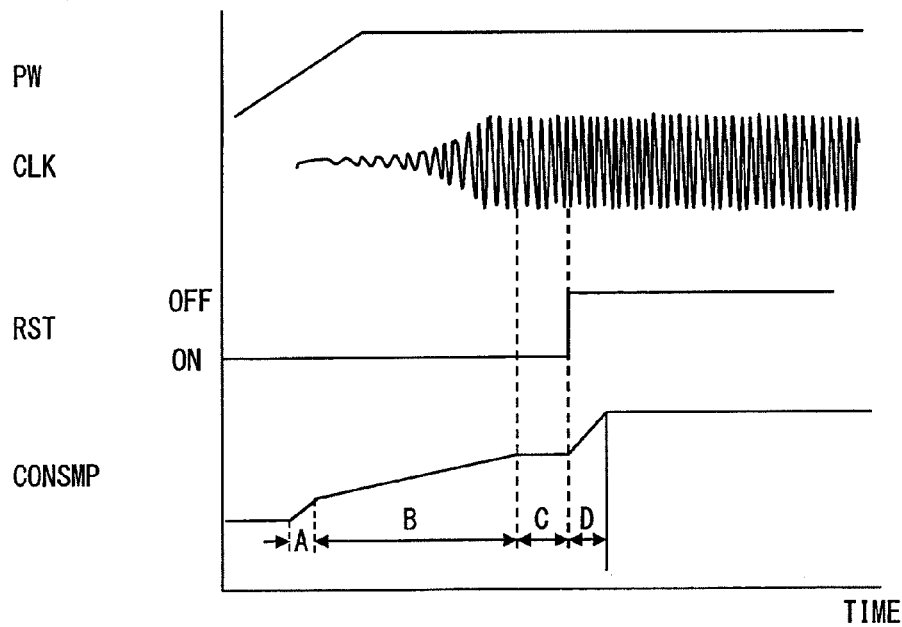
FIG. 2 is a diagram showing signal waveforms related to the microcomputer when the microcomputer is powered on from a power-off state.

During the startup period of the microcomputer 28, the reset control section 26 outputs the reset signal to the microcomputer 28, and performs a well-known power on reset. When the reset control section 26 receives, from the current measuring section 24, the instruction that instructs the reset control section 26 to end the output of the reset signal, the reset control section 26 stops the output of the reset signal corresponding to the instruction. However, when the power control section 16 outputs, to the reset control section 26, the forbiddance signal that instructs the reset control section 26 to not end the output of the reset signal, the reset control section 26 continues the output of the reset signal corresponding to the forbiddance signal even though the ending instruction signal that instructs the reset control section 26 to end the output of the reset signal is received. That is, under a condition that the forbiddance signal is not output from the power control section 16, the reset control section 26 ends the output of the reset signal corresponding to the ending instruction signal, which is output from the current measuring section 24 in order to instruct the reset control section 26 to end the output of the reset signal. When the reset control section 26 ends the output of the reset signal, the reset control section 26 outputs a switch instruction signal to the amplifier 22 to instruct the amplifier 22 to switch the amplifying degree from the high level to the low level. The following will describe the consumption current consumed by the microcomputer 28 and the oscillation circuit 30. FIG. 2 shows signal waveforms related to the microcomputer 28 over time when the microcomputer 28 is powered on from the power-off state by supplying power. In FIG. 2, "PW" represents the power supply line of the microcomputer 28, "CLK" represents the clock signal generated by the oscillation circuit 30, "RST" represents the reset signal input to the microcomputer 28, and "CONSMP" represents the consumption current signal of the microcomputer 28 and the oscillation circuit 30.

As shown in FIG. 2, when the power is supplied to the microcomputer 28 that is in the power-off state, initial current is generated and flows through each section of the microcomputer 28 and the oscillation circuit 30 during a period A.

Thus, during the period A, the consumption current corresponding to the initial current is generated.

During the period A, the CPU of the microcomputer 28 maintains in the off state corresponding to the reset signal. Thus, during the period B followed by the period A, the consumption current is generated corresponding to an operation of the oscillation circuit 30 and the internal clock oscillators of the microcomputer 28. As shown in FIG. 2, during the period B, the oscillation circuit 30 generates the clock signal. During the period B, an amplitude of the clock signal gradually increases with an increase in frequency of the clock signal until the amplitude increases to a predetermined level and the frequency increases to a predetermined level. Herein, the predetermined level is a target level which the frequency or the amplitude of the clock signal finally increases to. The consumption current of the oscillation circuit 30 changes with a change of the frequency and the amplitude of the clock signal. That is, the consumption current of the oscillation circuit 30 increases with an increase of the frequency and the amplitude of the clock signal. As a result, during the period B, the consumption current gradually increases over time. After the frequency and the amplitude of the clock signal increase to the respective predetermined levels, the frequency and the amplitude of the clock signal approximately maintain constant levels. Thus, during the period C, the consumption current maintains a constant value. As described above, the change in the consumption current of the oscillation circuit 30 is correlated with the change in the frequency and the amplitude of the clock signal. The current measuring section 24 preliminarily sets and stores a threshold value used in the measuring of the consumption current that is stabilized to the constant value. Specifically, the current measuring section 24 preliminarily sets the threshold value corresponding to the consumption current measured when the frequency and the amplitude of the clock signal become stable. That is, the current measuring section 24 preliminarily sets the threshold value corresponding to the consumption current measured when the frequency and the amplitude of the clock signal increase to the respective predetermined levels. Thus, when the voltage signal detected by the current measuring section 24 is equal to or higher than the preliminarily set threshold value, the reset signal control apparatus determines that the clock signal generated by the oscillation circuit 30 is stabilized.

Accordingly, under a condition that the voltage signal detected by the current measuring section 24 is equal to or higher than the preliminarily set threshold value, the reset control section ends the output of the reset signal. With this configuration, after the clock signal is stabilized, the output of the reset signal can be ended promptly without a delay.

As described above, when the frequency and the amplitude of the clock signal increase to the respective predetermined levels, the consumption current approximately stabilizes around the constant value. Thus, when the voltage signal becomes equal to or higher than the threshold value and the change amount of the voltage signal is equal to or smaller than the predetermined allowable change amount for a predetermined period, the current measuring section 24 may instruct the reset control section 26 to end the output of the reset signal. In the present embodiment, the stabilization of the clock signal can be detected at high accuracy by considering the change amount of the consumption current of the oscillation circuit 30.

In FIG. 2, during the period C, the voltage signal becomes equal to or higher than the threshold value, and the change amount of the voltage signal, that is, the change amount of the consumption current stays within the allowable change amount. Thus, the output of the reset signal is ended, that is, the reset signal is switched from an on state to an off state. During the period D followed by the period C, the CPU of the microcomputer 28 starts operation, and accordingly, the consumption current increases. The consumption current continues to increase until when the CPU of the microcomputer 28 enters a properly operating state, and then, the consumption current approximately maintains a constant value.

Second Embodiment

Figure 3:
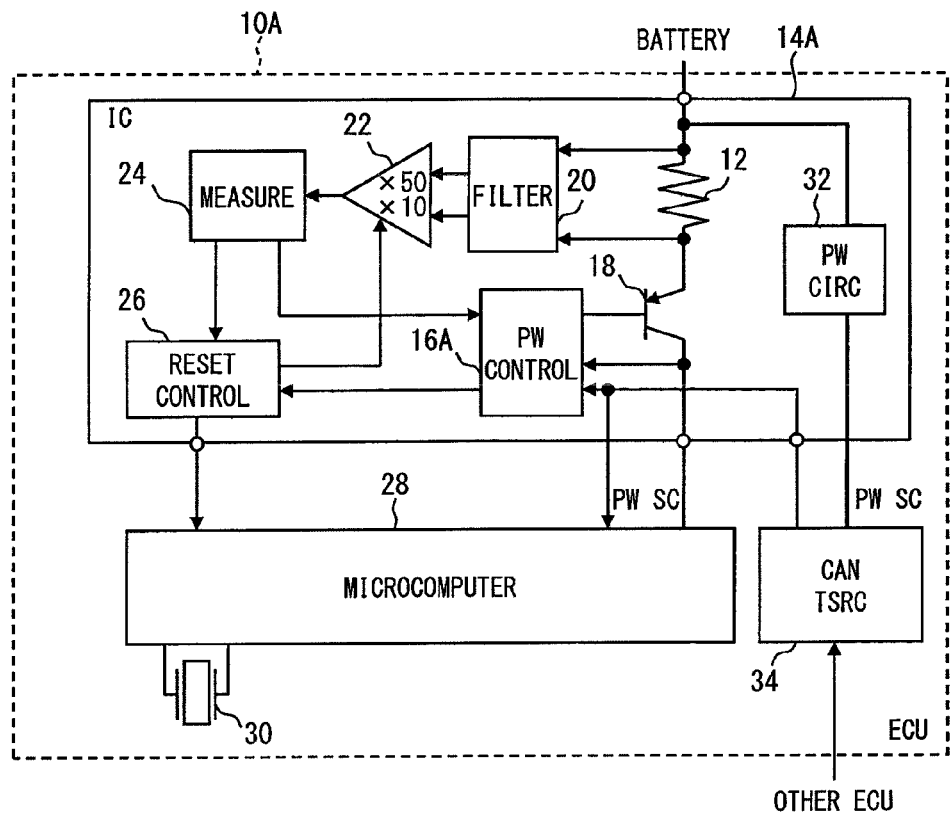
FIG. 3 is a diagram showing a configuration of an electronic control apparatus including a reset signal control apparatus according to a second embodiment of the present disclosure.
Figure 4:
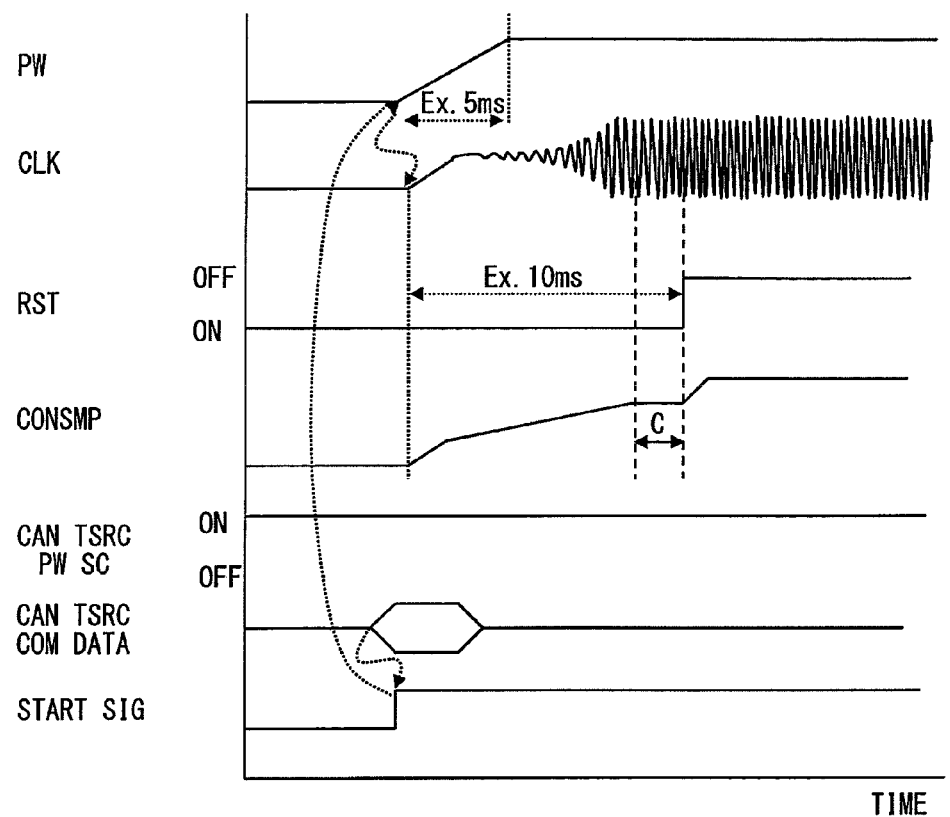
FIG. 4 is a diagram showing signal waveforms related to the microcomputer when the microcomputer is woken up from a sleep mode.

The following will describe a reset signal control apparatus according to a second embodiment of the present disclosure with reference to FIG. 3 and FIG. 4. In the present embodiment, the same reference symbol or number is used to a part same with or equal to the first embodiment.

In the first embodiment, when the ECU 10 is powered on, the reset signal is output to the microcomputer 28. The present embodiment will describe an example in which the reset signal is output to the microcomputer 28 when the microcomputer 28 wakes up from a sleep mode. That is, the reset signal control apparatus according to the present disclosure may also be applied to a case in which, in response to a startup signal that is input to the microcomputer 28, a power supply to the microcomputer 28 is started for wake up the microcomputer 28 from a sleep mode in which the power supply is interrupted. As shown in FIG. 3, an ECU 10A according to the present embodiment includes a CAN (registered trademark) transceiver 34 that performs communication with an external device, such as ECUs other than the ECU 10A, based on controller area network (CAN). The ECU 10A includes an IC 14A, and the IC 14A includes a power supply circuit (PW CIRC) 32 that supplies power to the CAN transceiver (CAN TSRC) 34.

The microcomputer 28 according to the present embodiment has two operation modes including a normal operation mode and a sleep mode. When the microcomputer 28 operates in the sleep mode, the power control section 16A interrupts power supply to the microcomputer 28 and the oscillation circuit 30 in order to restrict power consumption.

During the sleep mode, the power supply circuit 32 is able to supply power to the CAN transceiver 34, and the CAN transceiver 34 is able to receive communication data from other ECUs.

As shown in FIG. 4, when the CAN transceiver 34 receives communication data (COM DATA) that instructs the startup of the microcomputer 28, the CAN transceiver 34 outputs a startup signal (START SIG) to the power control section 16A, and the power control section 16A starts the power supply to the microcomputer 28 and the oscillation circuit 30. With this configuration, the microcomputer 28 starts operation.

Similar to the first embodiment, the reset signal control apparatus according to the present embodiment determines a stabilization of the clock signal based on the change amount of the consumption current of the oscillation circuit 30, and ends the output of the reset signal to the microcomputer 28. Thus, after the receiving of the communication data that instructs the startup of the microcomputer 28 from other ECUs, the microcomputer 28 can promptly start operation corresponding to the communication data.

As a modification, as shown in FIG. 3, each component of the reset signal control apparatus may be integrally included in single chip as an integrated circuit 14A.

In the foregoing embodiments, the power control section 16, 16A and the transistor 18 function as a power supply section. The resistor 12, the low pass filter 20, the amplifier 22, and the current measuring section 24 function as a measuring section. The reset control section 26 functions as an output ending section.

While only the selected exemplary embodiments have been chosen to illustrate the present disclosure, it will be apparent to those skilled in the art from this disclosure that various changes and modifications can be made therein without departing from the scope of the disclosure as defined in the appended claims.

Furthermore, the foregoing description of the exemplary embodiments according to the present disclosure is provided for illustration only, and not for the purpose of limiting the disclosure as defined by the appended claims and their equivalents.

What is claimed is:

1. A reset signal control apparatus that outputs a reset signal to a microcomputer in order to restrict a malfunction of the microcomputer when the microcomputer is started, the microcomputer being connected with an oscillation circuit that provides a clock signal to the microcomputer and the reset signal control apparatus outputting the reset signal to the microcomputer at least until the clock signal based on which the microcomputer operates is stabilized, the reset signal control apparatus comprising:
a power supply section supplying a power to the oscillation circuit and the microcomputer;
a measuring section measuring a consumption current of the oscillation circuit and the microcomputer while the power supply section supplies the power to the oscillation circuit and the microcomputer; and
an output ending section, when the measuring section determines that the consumption current becomes equal to or higher than a predetermined threshold value, determining that the clock signal provided by the oscillation circuit is stabilized and ending an output of the reset signal to the microcomputer, wherein
the output ending section determines that the clock signal is stabilized and ends the output of the reset signal when the measuring section determines that the consumption current maintains equal to or higher than the predetermined threshold value and a change amount of the consumption current stays within a predetermined allowable range for a predetermined period.

2. The reset signal control apparatus according to claim 1, wherein the measuring section includes a low pass filter attenuating an unwanted component signal included in a signal of the consumption current, and the unwanted component signal has a frequency equal to or higher than a predetermined frequency.

3. The reset signal control apparatus according to claim 1, further comprising
a voltage detection section detecting a voltage of the power supplied to the oscillation circuit and the microcomputer,
wherein, when the voltage detection section determines that the voltage of the power is equal to or higher than a predetermined threshold voltage, the output ending section ends the output of the reset signal.

4. The reset signal control apparatus according to claim 3, wherein, when the voltage detection section determines that the voltage of the power is equal to or higher than the predetermined threshold voltage and a change amount of the voltage of the power is smaller than a predetermined allowable change amount, the output ending section ends the output of the reset signal.

5. The reset signal control apparatus according to claim 1, wherein the measuring section further detects and measures an overcurrent flowing through the oscillation circuit and the microcomputer, and
wherein the power supply section stops supplying the power to the oscillation circuit and the microcomputer when the measuring section detects that the overcurrent flows through the oscillation circuit and the microcomputer.

6. The reset signal control apparatus according to claim 5, wherein the measuring section includes an amplifying circuit that amplifies the consumption current of the oscillation circuit and the microcomputer,
wherein the amplifying circuit switches an amplifying gain between a first level and a second level that is lower than the first level, and
wherein the amplifying circuit sets the amplifying gain to the first level during the output of the reset signal, and sets the amplifying gain to the second level after the output of the reset signal is ended.

7. The reset signal control apparatus according to claim 1, wherein the measuring section has a resistor that converts the consumption current to a consumption voltage,
wherein the output ending section ends the output of the reset signal based on the consumption voltage,
wherein the power supply section, the measuring section, and the output ending section are disposed integrally in a chip as an integrated circuit, and
wherein the resistor is connected with the integrated circuit at an external side of the integrated circuit.

8. The reset signal control apparatus according to claim 1, wherein the microcomputer has two operation modes including a sleep mode and a normal operation mode,
wherein, when the microcomputer operates in the sleep mode, the power supply section forbids the supplying of the power to the oscillation circuit and the microcomputer, and
wherein, when a startup signal from an external device is input to the microcomputer, the power supply section restarts the supplying of the power to the oscillation circuit and the microcomputer in order to start the microcomputer.

* * * * *